United States Patent
Bennett et al.

(10) Patent No.: US 7,080,230 B2
(45) Date of Patent: Jul. 18, 2006

(54) BROADCASTING ERROR NOTIFICATIONS IN SYSTEM WITH DYNAMIC PARTITIONING

(75) Inventors: James William Bennett, Rochester, MN (US); Michael J. Brinker, Rochester, MN (US); Christopher Willard Moberg, Rochester, MN (US); Christopher James Shomenta, Rochester, MN (US); Calvin Dean Ward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 10/424,635

(22) Filed: Apr. 25, 2003

(65) Prior Publication Data

US 2004/0215916 A1     Oct. 28, 2004

(51) Int. Cl.
*G06F 13/00* (2006.01)

(52) U.S. Cl. .................... 711/173; 711/156; 711/209

(58) Field of Classification Search ............. 711/156, 711/173, 209
See application file for complete search history.

(56) References Cited

U.S. PATENT DOCUMENTS

| | | | | |
|---|---|---|---|---|
| 5,564,040 A | * | 10/1996 | Kubala | 711/173 |
| 5,784,702 A | * | 7/1998 | Greenstein et al. | 711/173 |
| 6,438,671 B1 | * | 8/2002 | Doing et al. | 711/173 |
| 6,823,482 B1 | * | 11/2004 | Ahrens et al. | 714/57 |

* cited by examiner

*Primary Examiner*—Reba I. Elmore
(74) *Attorney, Agent, or Firm*—Patterson & Sheridan, LLP (57) ABSTRACT

Method, apparatus and article of manufacture for error notification in a dynamically partitioned environment in which logical partitions are added and/or removed during operation of a system. Logical partitions are notified of errors based on a predefined criterion(s). In one aspect, a criterion is applied to the maintenance of an error notifications list. In another aspect, a notification and/or acknowledgment criterion is applied in the determination of whether to notify a logical partition of an error notification that has not been discarded.

30 Claims, 5 Drawing Sheets

BROADCASTING ERROR NOTIFICATIONS IN SYSTEM WITH DYNAMIC PARTITIONING

BACKGROUND OF THE INVENTION

1. Field of the Invention

The present invention generally relates to data processing and more particularly to handling error notifications in a system with dynamic partitioning.

2. Description of the Related Art

Logical partitioning refers to the ability to make a system run as if it were two or more independent systems. Each logical partition represents a division of resources in the system and operates as an independent logical system. Each partition is logical because the division of resources may be physical or virtual. An example of logical partitions is the partitioning of a multiprocessor computer system into multiple independent servers, each with its own processors, main storage, and I/O devices. One of multiple different operating systems, such as AIX, LINUX, and others can be running in each partition.

During operation of any system, errors inevitably occur. In a logically partitioned system, some errors (Local) are only reported to the assigned or owning partition's operating system. Failures of the I/O adapters which are only assigned to a single partition's operating system are example of such errors. Other errors (Global) are reported to all partition's operating system because such errors potentially affect the operation of multiple partitions. Examples of these types of errors are power supply, fan, memory, processor failures and the like. Global errors are typically broadcast to the logical partitions on a system by a partition manager, corresponding to lower-level code residing between the partitions and the hardware resources of the system.

While broadcasting errors works well in a static environment, such an approach is not suitable for a dynamically partitioned environment in which logical partitions are added and/or removed dynamically during operation of the system. In a system incorporating dynamic logical partitioning, a logical partition may report in shortly after an error notifications broadcast, thus missing the notification even though the partition may be affected by the error condition. A possible solution to this problem is to queue up all error notifications and broadcast only when a logical partition becomes active. However, if the partition is only activated sporadically, this approach may result in flooding the partition's error notification point with stale errors that are no longer relevant, due to the amount of time that has elapsed.

Therefore, there is a need for a system and method for error notification in a dynamically partitioned environment.

SUMMARY OF THE INVENTION

The present invention generally pertains to error management and error notification in a dynamically partitioned environment.

One embodiment provides a method for notifying a logical partition of an error in a dynamically partitioned environment. The method includes receiving an error notification; deleting the error notification only when a criterion is satisfied; changing a number of active logical partitions on a system; notifying at least one of the active logical partitions of the error notification only if the criterion remains unsatisfied.

Another embodiment for notifying logical partitions of errors in a dynamically partitioned environment includes receiving a plurality of error notifications; changing a number of active logical partitions on a system; and notifying at least one of the active logical partitions of at least one of the plurality of error notifications if predefined criteria remain unsatisfied, wherein at least one criterion of the predefined criteria is used to determine which of the plurality of error notifications can be deleted.

Yet another embodiment for notifying logical partitions of errors in a dynamically partitioned environment, comprises: receiving a plurality of error notifications; changing a number of active logical partitions on a system; applying at least a first criterion to the plurality of error notifications; and deleting one or more of the plurality of error notifications which satisfy the first criterion. A second criterion is applied with respect to a list of active logical partitions to determine at least one of: (i) whether each logical partition in the list has been previously notified of the remaining plurality of error notifications; and (ii) whether each logical partition in the list has acknowledged receipt of a previous notification of the remaining plurality of error notifications. Each logical partition in the list is notified of each of those of the remaining plurality of error notifications which fails to satisfy the second criterion.

Yet another embodiment provides a computer readable medium containing an error notification program which, when executed on a logically partitioned computer system, performs an operation in a dynamically partitioned environment in which logical partitions are dynamically added and removed during operation of a computer system. The operation includes managing a list of error notifications by periodically removing one or more error notifications from the list of error notifications if at least a first criterion is satisfied; and periodically notifying a logical partition of an error notification in the list of error notifications.

Still another embodiment provides a computer including a plurality of resources including memory and at least one processor; a logical partition manager configured to at least manage one or more logical partitions present on the computerized apparatus and configured to dynamically add and remove logical partitions in the memory during operation of the computer; and an error manager. The error manager is configured to manage a list of error notifications by periodically removing one or more error notifications from the list of error notifications if at least a first criterion is satisfied; and periodically notify a logical partition of an error notification in the list of error notifications.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally pertains to error notification in a dynamically partitioned environment. In a dynamically partitioned environment, logical partitions are added and/or removed during operation of a system. Aspects of the present invention provide a method and system for notifying logical partitions of errors based on a predefined criterion(s). In one aspect, a criterion is applied to the maintenance of an error notifications list. For example, if a predefined criterion(s) for a particular error is satisfied, the error is discarded. If the criterion is not satisfied, then each active logical partition which has not been previously notified of the error, is notified. In another aspect, a notification and/or acknowledgment criterion is applied in the determination of whether to notify a logical partition of an error notification that has not been discarded. For example, if the logical partition has been previously notified of the error notification, then a subsequent notification of the same error may not be necessary or may be undesirable.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
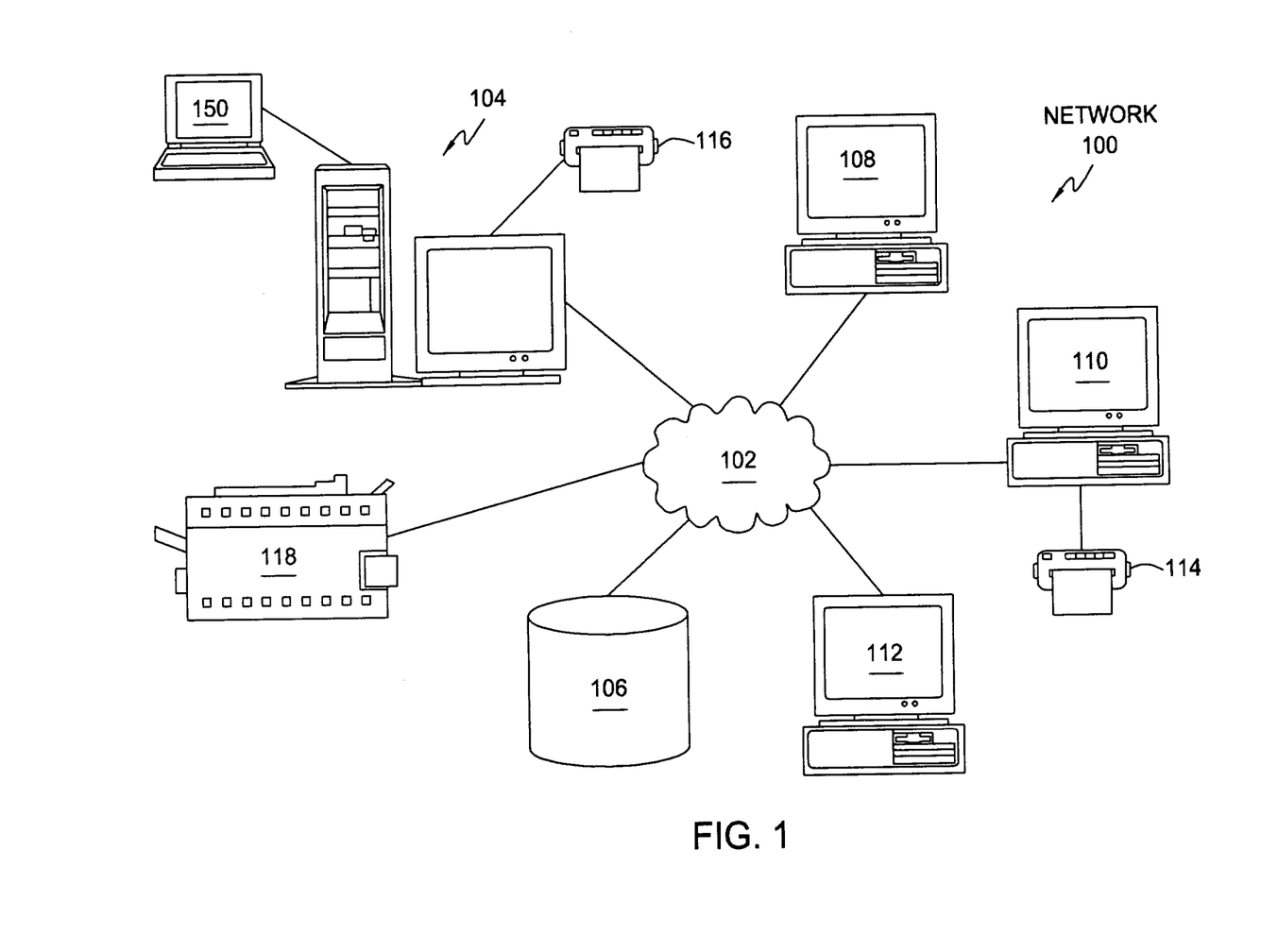
FIG. 1 is a block diagram of a network of computers, including a logically partitioned computer.

Referring now to FIG. 1, a distributed data processing system 100 is shown. The distributed data processing system 100 is a network of computers in which the present invention may be implemented. The distributed data processing system 100 includes a network 102, which is the medium used to provide communications links between various devices and computers connected within the distributed data processing system 100. The network 102 may include permanent connections, such as wire or fiber optic cables, or temporary connections made through telephone connections. In a particular example, the distributed data processing system 100 is the Internet, with the network 102 representing a worldwide collection of networks and gateways that use the TCP/IP suite of protocols to communicate with one another. The distributed data processing system 100 also may be implemented as a number of different types of networks such as, for example, an intranet or a local area network.

In the depicted example, a data processing system 104 configured as a server is connected to the network 102, along with a storage unit 106. A plurality of clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, the server 104 is a logically partitioned platform and provides data, such as boot files, operating system images and applications, to the clients 108–112.

The server 104 is connected to a hardware system console 150. The hardware system console 150 may be a laptop computer and is used to display messages to an operator from each operating system image running on the server 104, as well as to send input information received from the operator, to the server 104.

The distributed data processing system 100 also includes devices such as printers 114, 116 and 118. A client, such as client 110, may print directly to the printer 114. In contrast, clients, such as the clients 108 and 112, do not have directly attached printers. These clients may print to printer 116, which is attached to the server 104, or to the printer 118, which is a network printer that does not require connection to a computer for printing documents. The client 110, alternatively, may print to the printer 116 or the printer 118, depending on the printer type and the document requirements. Of course, the distributed data processing system 100 may include additional servers, clients, and other devices not shown.

It is noted that the distributed system 100 shown in FIG. 1 is merely representative, and the other embodiments or contemplated. For example, although the server 104 is shown as a component of a distributed system, the invention may also be practiced in a standalone system.

Figure 2:
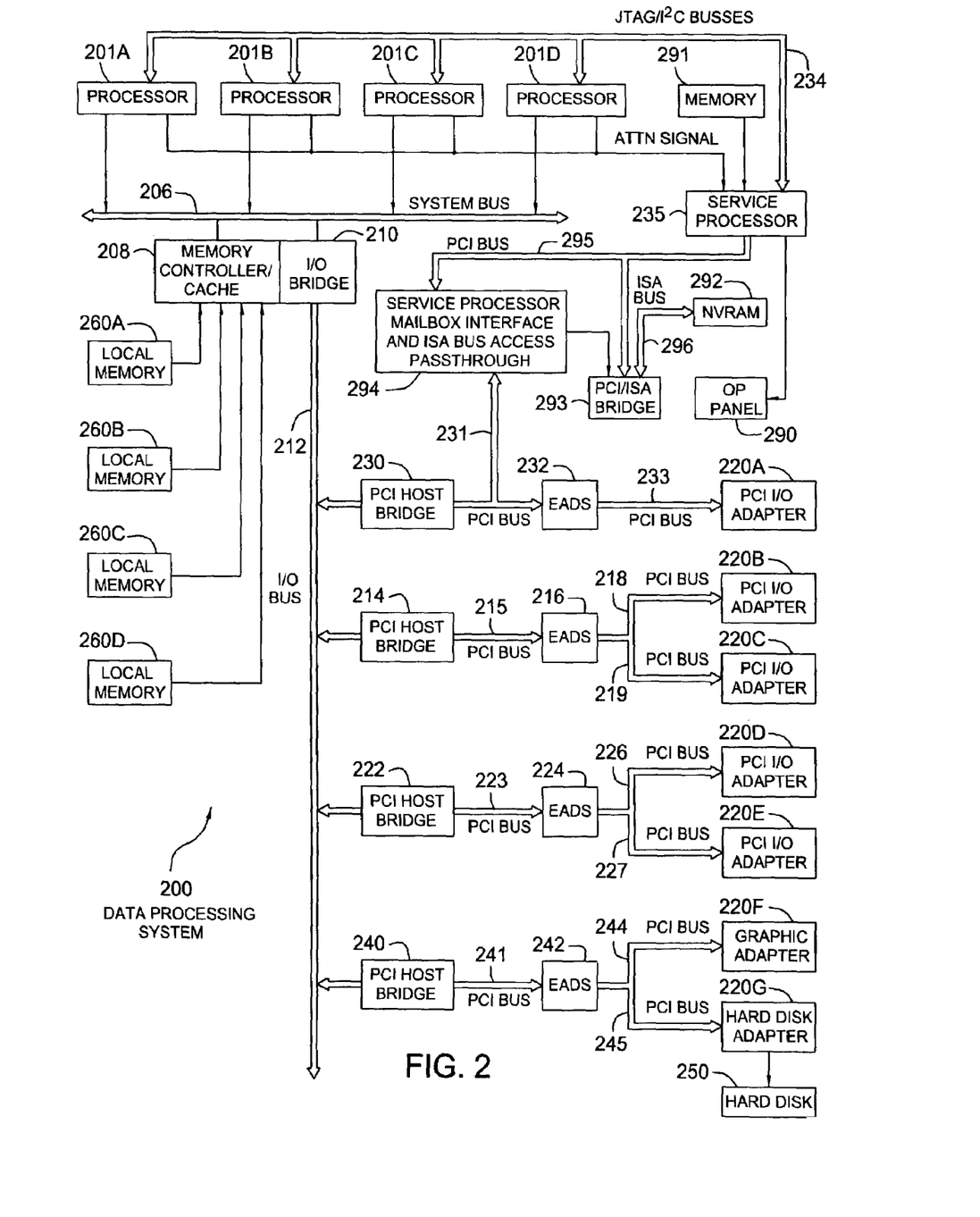
FIG. 2 is a block diagram of a logically partitioned computer illustrating hardware resources that may be partitioned.

Referring now to FIG. 2, an illustrative representation of the server 104 (more generally referred to as "data processing system 104") is shown which depicts various resources that may be allocated between various logical partitions. Illustratively, data processing system 104 is a symmetric multiprocessor (SMP) system including a plurality of processors 201A–D connected to system bus 206. In a particular embodiment, data processing system 104 may be an eServer iSeries computer, a product of International Business Machines Corporation in Armonk, N.Y., implemented as a server within a network. Although shown as a SMP system, a single processor system may alternatively be employed. Also connected to system bus 206 is memory controller/cache 208, which provides an interface to a plurality of local memories 260A–D. I/O bus bridge 210 is connected to system bus 206 and provides an interface to I/O bus 212. Memory controller/cache 208 and I/O bus bridge 210 may be integrated as depicted.

The data processing system is a Peripheral Component Interconnect (PCI) bus implementation which supports a plurality of Input/Output adapters. Typical PCI bus implementations will support between four and eight I/O adapters (i.e. expansion slots for add-in connectors). Illustratively, the processing system 104 includes seven (7) I/O adapters 220A–G. Each I/O Adapter 220A–G provides an interface between data processing system 104 and input/output devices such as, for example, other network computers, which are clients to data processing system 104. By way of example, a PCI Host bridge (PHB) 214 connected to I/O bus 212 provides an interface to PCI local bus 215. A number (two shown) of I/O adapters 220B–C may be connected to PCI bus 215 via EADS 216 and respective PCI buses 218 and 219. Other I/O adapters may be similarly connected by respective PCI host bridges (e.g., bridges 222, 230 and 240), EADS (e.g., EADS 224, 232, and 242) and PCI buses (e.g., 223, 226–227, 231, 233, 241 and 244–245). It is noted that EADS is a PCI multifunction device that contains multiple PCI—PCI bridge devices as individual functions of the EADS device. Each PCI–PCI bridge device connects to a PCI adapter slot or an adapter chip embedded with EADS on a PCI bus backplane. In one embodiment, each EADS PCI—PCI bridge includes logic that provides logical partition error and DMA isolation, so that errors and DMA requests associated with a particular slot affect only the partition that owns that slot, and no others sharing the same PHB (to other slots).

As examples of particular types of adapters, the system 104 includes a memory mapped graphics adapter 220F, which may be connected to I/O bus 212 through the PCI Host Bridge 240 and EADS 242 via PCI buses 241 and 244 as depicted. Also, a hard disk 250 may be connected to I/O bus 212 through PCI Host Bridge 240 and EADS 242 via PCI buses 241 and 245, and a hard disk adaptor 220G as depicted.

The PCI host bridge 230 provides an interface for a PCI bus 231 to connect to I/O bus 212. PCI bus 231 connects PCI host bridge 230 to the service processor mailbox interface and ISA bus access passthrough logic 294 and EADS 232. The ISA bus access passthrough logic 294 forwards PCI accesses destined to the PCI/ISA bridge 293, which also connects to NV-RAM storage 292 via an ISA bus 296. A Service processor 235 is coupled to the service processor mailbox interface 294 through its local PCI bus 295. The service processor 235 is also connected to processors 201A–D via a plurality of JTAG/I$^2$C buses 234. JTAG/I$^2$C buses 234 are a combination of JTAG/scan buses (see IEEE 1149.1) and Phillips I$^2$C buses. However, alternatively, JTAG/I$^2$C buses 234 may be replaced by only Phillips I$^2$C buses or only JTAG/scan buses. All SP-ATTN signals of the host processors 201A–D are connected together to an interrupt input signal of the service processor 235. The service processor 235 has its own local memory 291, and has access to the hardware op-panel 290.

When data processing system 104 is initially powered up, service processor 235 uses the JTAG/scan buses 234 to interrogate the system (Host) processors 201 A–D, memory controller 208, and I/O bridge 210. At completion of this step, service processor 235 has an inventory and topology understanding of data processing system 104. Service processor 235 also executes Built-In-Self-Tests (BISTs), Basic Assurance Tests (BATs), and memory tests on all elements found by interrogating the system processors 201A–D, memory controller 208, and I/O bridge 210. Any error information or failures detected during the BISTs, BATs, and memory tests may be gathered and reported by service processor 235. It is noted that these errors and failures may be handled by an embodiment of the present invention.

If a meaningful/valid configuration of system resources is still possible after taking out the elements found to be faulty during the BISTs, BATs, and memory tests, then the data processing system 104 is allowed to proceed to load executable code into local (Host) memories 260A–D. Service processor 235 then releases the Host processors 201A–D for execution of the code loaded into Host memory 260A–D, also according to the determined state. The service processor 235 may also perform monitoring functions, such as checking for, and reporting, errors in the data processing system 104. Logical partitions on the system 104 are notified of the errors according to the embodiments described in more detail below.

It is understood that FIG. 2 is merely one configuration for a data processing system. Embodiments of the invention can apply to any comparable configuration, regardless of whether the system 104 is a complicated multi-user apparatus, a single-user workstation, or a network appliance that does not have non-volatile storage of its own. As such, the depicted example is not meant to imply architectural limitations with respect to the present invention and those of ordinary skill in the art will appreciate that the hardware depicted in FIG. 2 may vary. For example, other peripheral devices, such as optical disk drives and the like, also may be used in addition to or in place of the hardware depicted. In addition, the system 104 may be a single processor system instead of a multiprocessor system.

As noted above, the server computer 104 is logically partitioned, whereby each separate group of resources of a logical partition is under the control of a separate operating system. Thus, the data processing system 104 may have multiple heterogeneous operating systems (or multiple instances of a single operating system) running simultaneously. Each of these multiple operating systems may have any number of software programs executing within it. When logically partitioned, different hardware resources, such as processors 201A–D, memories 260A–D, and I/O adapters 220A–E may be assigned to different logical partitions.

For example, suppose data processing system 104 is divided into three logical partitions, P1, P2, and P3 where each partition has a different operating system assigned to it. Thus, one instance of the Advanced Interactive Executive (AIX) operating system may be executing within partition P1, a second instance (image) of the AIX operating system may be executing within partition P2, and a Windows 2000 operating system may be operating within logical partition P3. Windows 2000 is a product and trademark of Microsoft Corporation of Redmond, Wash.

Each operating system executing within data processing system 104 may access only those I/O units that are within its logical partition. Thus, each of I/O adapters 220A–E, each of the processors 201A–D, each of the local memories 260A–D is assigned to one of the three partitions. For example, processor 201A, memory 260A, and I/O adapters 220B, 220D, and 220E may be assigned to logical partition P1; processors 202B–C, memory 260B, and I/O adapters 220C and 220A may be assigned to partition P2; and processor 201 D, memories 262C–D, and I/O adapters 220F–G may be assigned to logical partition P3. It should be noted, however, that even singular resources may be shared. For example, the system 104 may be a single processor system, in which the single processor is a shared resource between multiple logical partitions. In such a hardware environment, each logical partition "owns" a fractional portion of the processor.

Figure 3:
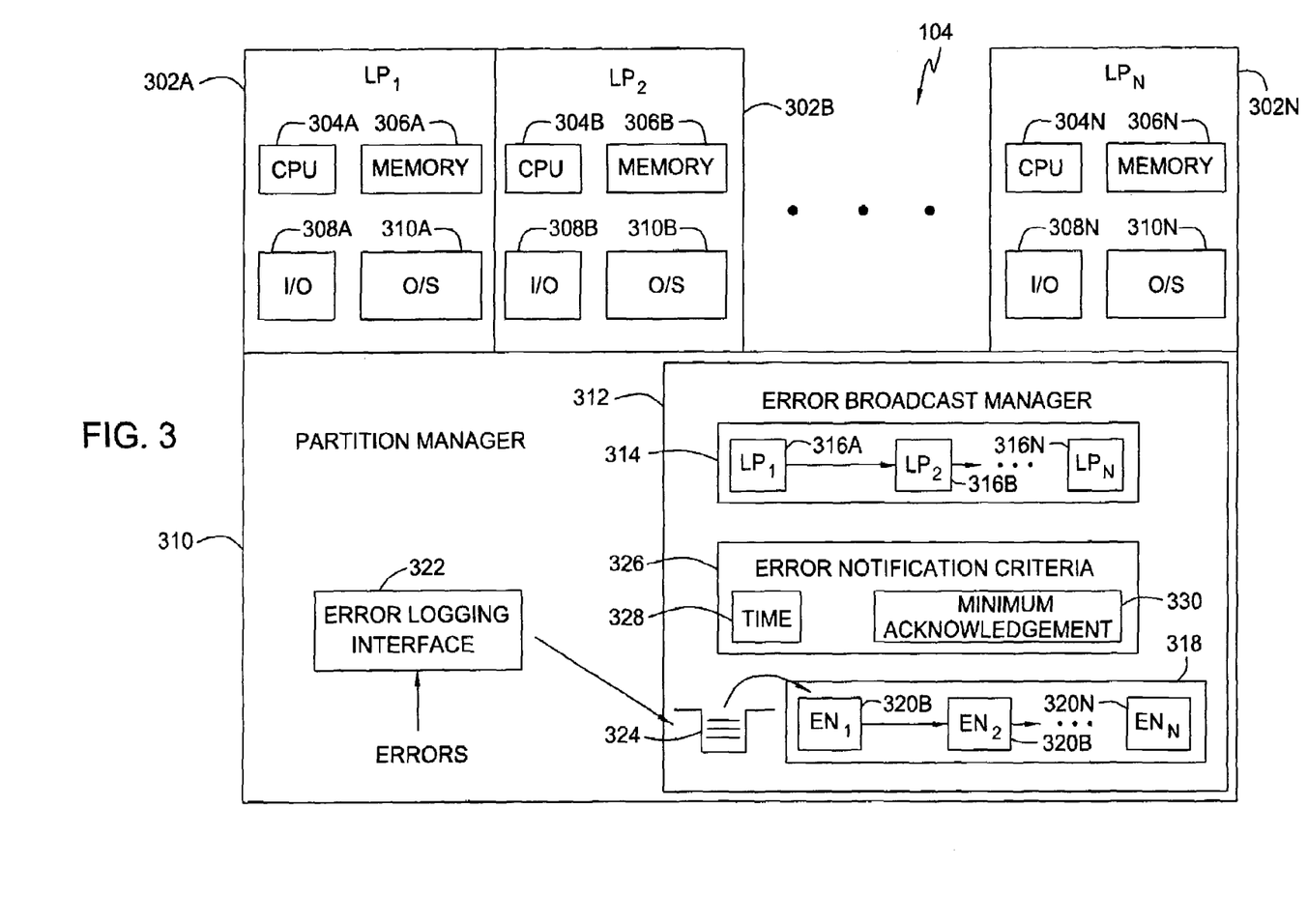
FIG. 3 is a block diagram of a logically partitioned computer configured with an error broadcast manager.

Referring now to FIG. 3, one representation of a logically partitioned instance of the data processing system 104 is shown. The system 104 includes multiple logical partitions 302A, 302B, . . . 302N (collectively, logical partitions 302). In a particular embodiment, the system 104 may have up to sixty-two logical partitions 302; however, the particular capacity for logical partitions is not limiting of the invention. The logical partitions are managed by a partition manager 312. Each logical partition 302 has processor(s) 304A, 304B, . . . 304N, memory 306A, 306B, . . . 306N, and I/O devices 308A, 308B, . . . 308N, and may run its own operating system 310A, 310B, . . . 310N independently of the other logical partitions 302. The resources associated with the various partitions 302 may be physical or logical/virtual. A virtual resource represents the capacity of a logical partition to the resource, which capacity is made available by one or more resources not exclusively under the control of the partition. A virtual processor, for example, corresponds to processing capability provided by one or more physical processors. Where virtual processors are implemented, the logical partitions do not have exclusive ownership over specific physical processors. Rather, the physical processors may be shared amongst the various logical partitions, and are available to the logical partitions according to the virtual processors defined for the respective logical partitions.

During operation, logical partitions may be added or dropped from the system 104 dynamically, and the system 104 is therefore referred to as being dynamically partitioned. In one embodiment, handling dynamic partitioning is the responsibility of a partition manager 310. In a particular embodiment, the partition manager 310 is implemented as a "Hypervisor", a software component available from International Business Machines, Inc. of Armonk, N.Y. To facilitate error handling in a dynamic partitioning environment, the partition manager 310 may include an error broadcast manager 312. Alternatively, the broadcast manager 312 may reside separately from the partition manager 310. In either case, the error broadcast manager 312 maintains an active logical partition list 314 (e.g., a linked list) indicating each logical partition which has reported in on the system 104. Accordingly, the active logical partition list 314 includes a record 316A, 316B, . . . 316N (collectively, records 316) for each of the logical partitions 302A, 302B, . . . 302N shown in FIG. 3. During operation of the system 104, the active logical partition list 314 is continuously updated as logical partitions are added or removed (i.e., activated or inactivated) on the system 104.

The error broadcast manager 312 also includes an error notifications list 318 (e.g., a linked list). The error notifications list 318 includes a plurality of error notifications 320A, 320B, . . . 320N (collectively, error notifications 320). Generally, each error notification 320 includes error data corresponding to a detected error. The errors may be from any variety of sources and of any variety of types. Illustrative errors include power errors, bus errors, memory errors, processor failures, etc.

In one embodiment, incoming error notifications are received by an error logging interface 322. In addition to logging error notifications, the error logging interface 322 may timestamp each error notification. In one embodiment, the error logging interface 322 may include a target partition list with all or selected error notifications.

In one embodiment, the error logging interface 322 places each error notification into a queue 324 managed by the error broadcast manager 312. The error broadcast manager 312 then dequeues each error notification and places it into the error notifications list 318.

The error broadcast manager 312 manages the error notifications list 318 according to error notification criterion(s) 326. In one embodiment, the error notification criterion(s) 326 includes a time criterion 328. The time criterion 328 specifies a minimum amount of time that must expire before an error notification 320 may be discarded (i.e., removed from the error notifications list 318). A single time period may be applied to all error notifications 320. Alternatively, separate time periods may be specified for different error types. Accordingly, although referred to herein as "time criterion 328", is understood that a plurality of time values may be specified for different error notifications 320. The error notification criterion(s) 326 may also include a minimum notification/acknowledgment criteria 330 (hereinafter referred to as the "minimum acknowledgment criteria 330"). The minimum acknowledgment criteria 330 specifies a minimum number of partitions that must be notified and/or acknowledge receipt of notification of an error notification 320 before the error notification 320 can be removed from the error notifications list 318. Alternatively or additionally, the minimum acknowledgment criteria 330 may specify a particular logical partition(s) that must be notified and/or acknowledge receipt of notification of an error notification 320 before the error notification 320 can be removed from the error notifications list 318. In another embodiment, the error notification criterion(s) 326 includes both the time criteria 328 and the minimum acknowledgment criteria 330. Accordingly, the error notification criterion(s) 326 may include only a single criterion or multiple criterions. For convenience, reference will be hereinafter made to "error notification criteria 326", although it will be understood that in any embodiment only a single criterion may be specified.

The particular criterion(s) included with the error notification criteria 326 generally depends on the configuration of the system 104. In particular, a significant consideration is ensuring that error notifications 320 are passed on to the appropriate entity charged with responding to the error. If a communication link to the appropriate entity for a given error is established on all logical partitions 302, then notifying only one active logical partition is sufficient. In some cases, the system 104 may include a service partition responsible for handling the error. In this case, the minimum acknowledgment criteria 330 specify that, at a minimum, the service partition must be notified and/or acknowledge receipt of notification. In other cases, a communication link (e.g., Ethernet) may be established to the responsible entity through the partition manager 310, in which case none of the logical partitions 302 need be notified. Instead, the error notifications 320 may be managed strictly according to the time criteria 328. In any case, the error notification criteria 326 are preferably user configurable.

Figure 4:
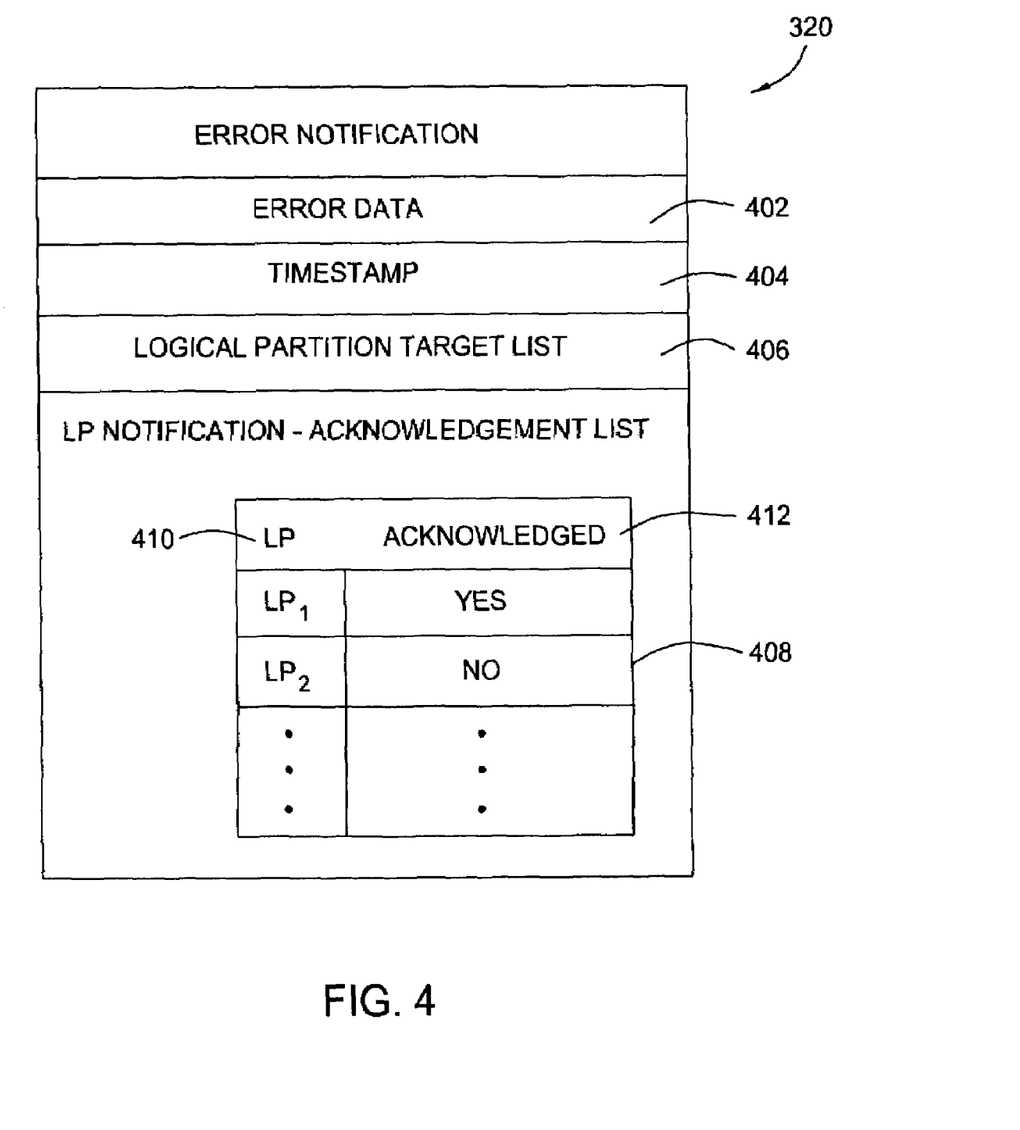
FIG. 4 is a representation of a notification-acknowledgment list.

Referring now to FIG. 4, one embodiment of an error notification 320 is shown. Illustratively, the error notification 320 includes Error Data 402 and a Timestamp 404 indicating, for example, when the error data was received by the error logging interface 322. In one embodiment, the error notification 320 also includes a Logical Partition Target List 406 representing selected logical partitions to receive copies of the error notification 320. In one embodiment, in the absence of a logical partition target list 406, all logical partitions on the system 104 will receive a copy of the error notification 320. The error notification 320 also includes a Logical Partition Notification-Acknowledgment List 408 (which may be referred to herein as simply "the list 408"). For simplicity of description, the list 408 is represented as a table having a "Logical Partition" column 410 and an "Acknowledged" column 412. The "Logical Partition" column 410 indicates each logical partition on the system 104 that has been notified of the particular error notification 320. The "Acknowledged" column 412 indicates whether or not the notified logical partition responded with an acknowledgment of the error notification.

Figure 5:
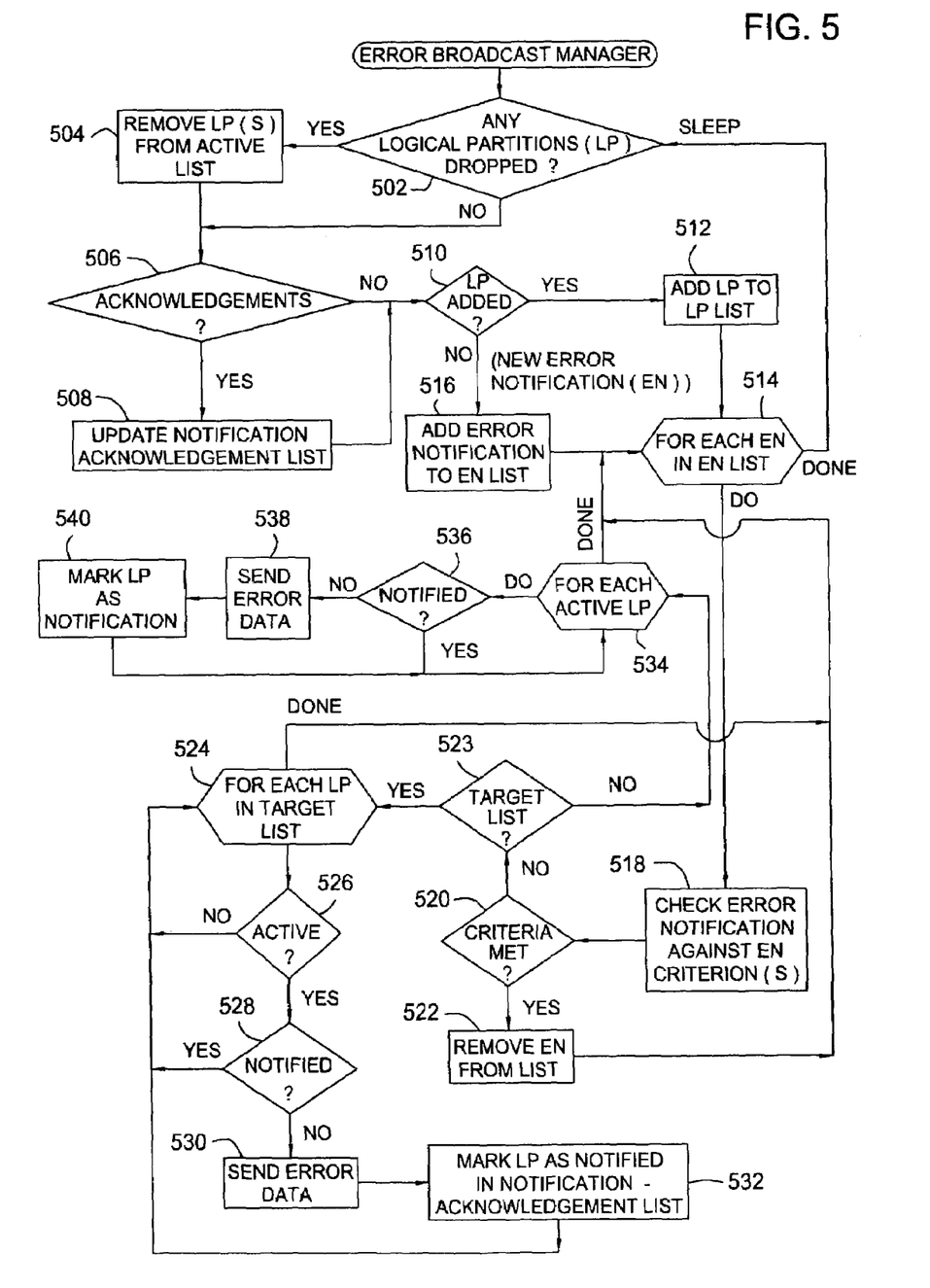
FIG. 5 is a flow chart illustrating one embodiment of the operation of the broadcast manager of FIG. 3.

Referring now to FIG. 5, a method 500 is shown illustrating one embodiment of the operation of the error broadcast manager 312. The error broadcast manager 312 may be configured as a task which sleeps until the occurrence of one of two specified events. Such events may include the addition of a logical partition or the placement of a new error notification 320 in the queue 324. Upon the occurrence of either such event, the error broadcast manager 312 wakes up and performs the steps of the method 500.

As an initial matter, the error broadcast manager 312 may determine whether any logical partitions 302 have been dropped during the time the error broadcast manager 312 was asleep (step 502) and whether any acknowledgments (of error notifications 320) have been received from one or more logical partitions 302 (step 506). If logical partitions have been dropped (determined at step 502), any such logical partitions are removed from the active logical partition list 314 (step 504). If any acknowledgments have been received (determined at step 506), the notification-acknowledgment list 408 is updated (step 508).

If the event that woke the error broadcast manager 312 is the addition of a new logical partition (determined at step 510), then the new logical partition is added to the active logical partition list 314 (step 512). The error broadcast manager 312 then enters a loop (step 514) for each error notification 320 in the error notification list 318. If the event that woke the error broadcast manager 312 is not the addition of a new logical partition, then the event is receipt of a new error notification 320 in the queue 324 (assuming that only these two events wake the error broadcast manager 312). Accordingly, the new error notification 320 is added to the error notification list 318 (step 516). The error broadcast manager 312 then enters a loop (step 514) for each error notification 320 in the error notification list 318.

Thus, the loop at step 514 is entered for both events which wake the error broadcast manager 312 (i.e., the addition of a logical partition and receipt of a new error notification) and is performed for each error notification 320 in the error notification list 318. The loop consists of first checking the given existing error notification 320 against the error notification criteria 326 (step 518). If the error notification criteria 326 are satisfied (determined at step 520), then the error notification 320 is removed from the error notification list 318 (step 522). If the error notification criteria 326 are not satisfied (determined at step 520), then the error broadcast manager 312 may determine whether the given error notification 320 includes a target list 406 (determined at step 523). If so, method 500 enters a subloop (step 524) for each logical partition listed in the target list 406 of the given error notification 320.

For a given logical partition listed in the target list 406, the error broadcast manager 312 determines whether the given logical partition is active with reference to the active logical partition list 314 (determined at step 526). If the given logical partition is not active, the next entry in the target list 406 is retrieved for processing (i.e., the subloop 524 is reentered for the next logical partition in the target list 406). If, however, the given logical partition is active, the error broadcast manager 312 determines whether the logical partition was previously notified of the given error notification (determined at step 528). If so, the next entry in the target list 406 is retrieved for processing (i.e., the subloop 524 is reentered for the next logical partition in the target list 406). In this manner, an error notification 320 will be sent to a logical partition only once, whether or not the logical partition acknowledges receipt of the error notification. This technique serves to minimize overhead (in the form of processing and memory) since the lack of acknowledgment indicates that the sent/receipt process is not working properly. However, it is contemplated that in some cases the error broadcast manager 312 may send another copy of the error notification to a logical partition previously notified of the error, but which has not acknowledged receipt. In any case, tracking acknowledgments (described above with respect to steps 506 and 508) allows the error broadcast manager 312 to conclusively determine that responsibility for an error has been delegated.

Returning to step 528, if the given logical partition of the target list 406 was not previously notified, then a copy of the error notification 320 (or at least the error data 402) is sent to the given logical partition (step 530). The notification-acknowledgment list 408 is then updated to indicate that the given logical partition has been notified (step 532). The subloop 524 is reentered for the next logical partition in the target list 406. This process is repeated for each logical partition listed in the target list 406, after which the method 500 returns to the loop entry point 514 and repeats the processing described above for the next error notification 320 in the error notification list 318.

As noted above, the absence of the target list 406 (as determined at step 523) in an error notification 320 may indicate that a copy of the error notification is to be provided to each active logical partition 302 on the system. In this case, the error broadcast manager 312 enters a subloop at step 534 and checks the active list 314 against each entry in the notification-acknowledgment list 408 (step 536). For each active logical partition which was not previously notified of a given error notification, a copy of the error notification is provided to that active logical partition (step 538) and the list 408 is updated to indicate the notification (step 540). This process is repeated for each logical partition listed in the active list 314, after which the method 500 returns to the loop entry point 514 and repeats the processing described above for the next error notification 320 in the error notification list 318.

Once the error broadcast manager 312 has iterated through each error notification 320 in the error notification list 318, the method 500 is complete and the error broadcast manager 312 goes to sleep.

It should be understood that the method 500 described with respect to FIG. 5, is merely illustrative of one embodiment. Persons skilled in the art will recognize other embodiments within the scope of the present invention. For example, additional logic may be implemented to respond to partitions believed to be active, but subsequently determined to have been inactive for a period of time, such as where a logical partition represented in the active list 314 reports to the partition manager 310. In this case, a determination can be made not to resend any pending error notifications (i.e., error notifications having notification-acknowledgment lists indicating that the error notification was sent but not acknowledged).

In another embodiment, the notification-acknowledgment lists of the various error notifications may be implemented as a separate single list for all errors. The error broadcast manager 312 may then reference this single list to determine whether an error notification must be copied to a logical partition. These and other embodiments are within the scope of the present invention.

Throughout the present description error management and error notification is implemented according to one or more criterion. By way of illustration only, aspects of the invention are described with respect to whether a criterion is satisfied or unsatisfied. It is understood that whether the implementation is based on a criterion that is satisfied or a criterion that remains unsatisfied is merely semantics, and both are within the scope of the invention. For example, the error broadcast manager 312 may implement a time criterion by requiring a timestamp of an error notification to exceed a specified length of time before discarding the error notification. In this case, error notifications are discarded when the time criterion is satisfied (i.e., when the specified length of time is exceeded). Alternatively, the error broadcast manager 312 may implement the time criterion by requiring the timestamp to be less than a length of time and discarding the error notification only when the condition is no longer satisfied.

While the foregoing is directed to embodiments of the present invention, other and further embodiments of the invention may be devised without departing from the basic scope thereof, and the scope thereof is determined by the claims that follow.

What is claimed is:

1. A method for notifying a logical partition of an error in a dynamically partitioned environment, comprising:
   receiving an error notification;
   deleting the error notification only when a criterion is satisfied;
   changing a number of active logical partitions on a system, each active logical partition having an allocated portion of at least one associated processor and memory and running an operating system; and
   notifying a processor of at least one of the active logical partitions of the error notification only if the criterion remains unsatisfied.

2. The method of claim 1, wherein the changing is performed by a partition manager.

3. The method of claim 1, wherein the notifying is performed by a partition manager.

4. The method of claim 1, wherein the criterion is a time criterion specifying a time period after which the notification is deleted.

5. The method of claim 1, wherein the criterion is a minimum notification criterion specifying one or more particular logical partitions which must be notified.

6. The method of claim 1, wherein the criterion is a minimum notification criterion specifying a particular number of logical partitions which must be notified.

7. The method of claim 1, wherein the criterion is a minimum acknowledgment criterion specifying one or more particular logical partitions which must acknowledge receipt of notification of the error notification.

8. A method for notifying logical partition of errors in a dynamically partitioned environment, comprising:
   receiving a plurality of error notifications;
   changing a number of active logical partitions on a system, each active logical partition having an allocated portion of at least one associated processor and memory and running an operating system; and
   notifying a processor of at least one of the active logical partition of at least one of the plurality of error notifications if predefined criteria remain unsatisfied, wherein at least one criterion of the predefined criteria is used to determine which of the plurality of error notifications can be deleted.

9. The method of claim 8, further comprising:
   periodically determining whether the at least one criterion is satisfied with respect to each of the plurality of error notifications; and
   deleting each of the plurality of error notifications which satisfy the at least one criterion.

10. The method of claim 8, wherein another criterion of the predefined criteria is whether the at least one of the logical partitions has been previously notified of the at least one of the plurality of error notifications.

11. The method of claim 8, wherein the at least one criterion is a time criterion specifying a time period after which an error notification is deleted.

12. The method of claim 8, wherein the at least one criterion is a minimum notification criterion specifying one of:
   one or more particular logical partitions which must be notified; and
   a particular number of logical partitions which must be notified.

13. The method of claim 8, wherein the at least one criterion wherein the criterion is a minimum acknowledgment criterion specifying one or more particular logical partitions which must acknowledge receipt of notification of the errors notification.

14. A method for notifying logical partitions of errors in a dynamically partitioned environment, comprising:
   receiving a plurality of error notifications;
   changing a number of active logical partitions an a system, each active logical partition having an allocated portion of at least one associated processor and memory and running an operating system;
   applying at least a first criterion to the plurality of error notification;
   deleting one or more of the plurality of error notifications which satisfy the first criterion;
   applying at least a second criterion with respect to a list of active logical partitions to determine at least one of:
      (i) whether each logical partition in the list has been previously notified of the remaining plurality of error notifications; and
      (ii) whether each logical partition in the list has acknowledged receipt of a previous notification of the remaining plurality of error notifications and notifying a processor of each logical partition in the list of each of those of the remaining plurality of error notifications which falls to satisfy the second criterion.

15. The method of claim 14, further comprising providing a target list for at least one of the remaining plurality of error notifications, the target list specifying one or more logical partitions to be notified; and wherein notifying each logical partition is done only for those logical partitions specified in the target list for a given error notification.

16. The method of claim 14, wherein applying the first criterion is performed periodically upon the occurrence of at least one of:
   adding an active logical partition to the system; and
   receiving a new error notification.

17. The method of claim 14, wherein the first criterion is a time criterion specifying a time period after which an error notification of the plurality of error notifications is deleted.

18. The method of claim 14, wherein the first criterion is a minimum notification criterion specifying one or more particular logical partitions which must be notified of an error notification of the plurality of error notifications.

19. The method of claim 14, wherein the first criterion is a minimum notification criterion specifying a particular number of logical partitions which must be notified.

20. The method of claim 14, wherein the first criterion is a minimum acknowledgment criterion specifying one or more particular logical partitions which must acknowledge receipt of notification of an error notification.

21. A tangible computer readable medium containing an error notification program which, when executed on a logically partitioned computer system, performs an operation in a dynamically partitioned environment in which logical partitions are dynamically added and removed during operation of the computer system, each logical partition having an allocated portion of at least one associated processor and memory and running an operating system, the operation comprising
   managing a list of error notifications by periodically removing one or more error notifications from the list of error notifications if at least a first criterion is satisfied; and
   periodically notifying a processor of a logical partition of an error notification in the list of error notifications.

22. The computer readable medium of claim 21, wherein the first criterion is a time criterion and wherein managing the list of error notifications comprises:
   determining whether a given error notification in the list has expired with respect to the time criterion; and
   if so, removing the given error notification from the list.

23. The computer readable medium of claim 21, wherein the first criterion is a notification criterion and wherein managing the list of error notifications comprises:
   determining whether a given logical partition has been notified of a given error notification in the list; and
   if so, removing the given error notification from the list.

24. The computer readable medium of claim 21, wherein the first criterion is an acknowledgment criterion and wherein managing the list of error notifications comprises:
   determining whether one or more logical partitions has acknowledged receipt of notification of a given error notification in the list; and
   if so, removing the given error notification from the list.

25. The computer readable medium of claim 21, wherein periodically notifying is done only if the logical partition has not been previously notified of the error notification.

26. A computer, comprising:
   a plurality of resources including memory and at least one processor,
   a logical partition manager configured to at least manage one or more logical partitions present on the computer and configured to dynamically add and remove logical partitions in the memory during operation of the computer, each logical partition having an allocated portion of at least one associated processor and memory and running an operating system; and
   an error manager configured to:
      manage a list of error notifications by periodically removing one or more error notifications from the list of error notifications if at least a first criterion is satisfied; and
      periodically notify a processor of a logical partition of an error notification in the list of error notifications.

27. The computer of claim 26, wherein the error manager is configured to manage in response to an occurrence of at least one of:
   adding an active logical partition to the system; and
   receiving a new error notification.

28. The computer of claim 26, wherein the first criterion is a time criterion specifying a time period after which a given error notification in the list of error notifications is deleted.

29. The computer of claim 26, wherein the error manager is configured to remove one or more error notifications from the list only if the first criterion and a second criterion are satisfied, wherein the first criterion is a time criterion specifying a time period after which a given error notification in the list of error notifications is deleted and wherein the second criterion is applied with respect a list of active logical partitions to determine at least one of:
   (i) whether each logical partition in the list has been previously notified of the given error notification in the list of error notifications; and
   (ii) whether each logical partition in the list has acknowledged receipt of a previous notification of the given error notification in the list of error notifications.

30. The computer of claim 26, wherein the error manager is configured to remove one or more error notifications from the list only if the first criterion and a second criterion are satisfied, wherein the first criterion is a minimum acknowledgment criterion specifying a number of one or more logical partitions which must acknowledge receipt of notification of a given error notification and wherein the second criterion is applied with respect a list of active logical partitions to determine at least one of:
   (i) whether each logical partition in the list has been previously notified of the given error notification in the list of error notifications; and
   (ii) whether each logical partition in the list has acknowledged receipt of a previous notification of the given error notification in the list of error notifications.

* * * * *